United States Patent
Hsu et al.

(10) Patent No.: US 9,755,473 B2
(45) Date of Patent: Sep. 5, 2017

(54) WATERPROOF AND DUSTPROOF MOTOR

(71) Applicant: DELTA ELECTRONICS, INC., Taoyuan Hsien (TW)

(72) Inventors: Chin-Chu Hsu, Taoyuan Hsien (TW); Cheng-Chia Hsiao, Taoyuan Hsien (TW); Hsiu-Wei Wu, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 386 days.

(21) Appl. No.: 14/278,880

(22) Filed: May 15, 2014

(65) Prior Publication Data

US 2015/0069886 A1  Mar. 12, 2015

(30) Foreign Application Priority Data

Sep. 12, 2013 (CN) .......................... 2013 1 0416228

(51) Int. Cl.
*H02K 11/00* (2016.01)
*H02K 5/10* (2006.01)
*H02K 11/33* (2016.01)
*H02K 1/14* (2006.01)
*H02K 5/22* (2006.01)

(52) U.S. Cl.
CPC ............... *H02K 5/10* (2013.01); *H02K 11/33* (2016.01); *H02K 1/148* (2013.01); *H02K 5/225* (2013.01)

(58) Field of Classification Search
CPC ............................. H02K 5/02; H02K 11/0073
USPC .................................................. 310/88, 68 D
See application file for complete search history.

(56) References Cited

U.S. PATENT DOCUMENTS

| | | | | |
|---|---|---|---|---|
| 5,963,442 | A * | 10/1999 | Yoshida ................... | B60L 1/00 318/801 |
| 6,753,629 | B2 * | 6/2004 | Doi ......................... | H02K 5/161 310/156.05 |
| 2002/0117914 | A1 * | 8/2002 | Doi ......................... | H02K 5/161 310/68 R |
| 2007/0188039 | A1 * | 8/2007 | Migita .................... | H02K 1/148 310/216.004 |
| 2007/0222305 | A1 * | 9/2007 | Takada .................. | H02K 1/2786 310/43 |
| 2010/0090640 | A1 * | 4/2010 | Maekawa ............... | H02K 1/276 318/701 |
| 2011/0291500 | A1 * | 12/2011 | Tang ...................... | H02K 11/0073 310/64 |

FOREIGN PATENT DOCUMENTS

TW                 201406047 A    2/2014

* cited by examiner

*Primary Examiner* — Terrance Kenerly
(74) *Attorney, Agent, or Firm* — Muncy, Geissler, Olds & Lowe, P.C.

(57) ABSTRACT

A motor structure is provided. The motor structure has: a motor; a circuit board including a driver circuit for controlling the motor; an upper shell; a base; a lower shell; an outlet, wherein wires of the circuit board is connected to the exterior of the motor structure through the outlet; a first tight chamber, formed by closing the upper shell and the base together, wherein the motor is disposed in the first tight chamber; and a second tight chamber, formed by closing the base and the lower shell together, wherein the circuit board is disposed in the second tight chamber.

8 Claims, 3 Drawing Sheets

WATERPROOF AND DUSTPROOF MOTOR

CROSS REFERENCE TO RELATED APPLICATIONS

This Non-provisional application claims priority under 35 U.S.C. §119(a) on Patent Application No(s). 201310416228.4, filed in the People's Republic of China on Sep. 12, 2013, the entire contents of which are hereby incorporated by reference.

BACKGROUND OF THE INVENTION

Field of the Invention

The present invention is related to improvements on the structure of motors.

Description of the Related Art

With the increasingly widespread use of motors, the requirements for motor performance have become more and more strict.

To operate in harsher environments, the present invention designs an external protection structure for motors to avoid damage from water and dust. In addition, the present invention further improves upon the silicon steel structure and the driver circuit of motors to increase operational efficiency and lower manufacturing cost.

BRIEF SUMMARY OF THE INVENTION

The present invention provides a motor structure. The motor structure has: a motor; a circuit board comprising a driver circuit for controlling the motor; an upper shell; a base; a lower shell; an outlet, wherein wires of the circuit board is connected to the exterior of the motor structure through the outlet; a first tight chamber, formed by closing the upper shell and the base together, wherein the motor is disposed in the first tight chamber; a second tight chamber, formed by closing the base and the lower shell together, wherein the circuit board is disposed in the second tight chamber.

The present invention provides an embodiment of a silicon steel stator structure comprising: a plurality of poles, covered with insulated plastic and corresponding to a plurality of magnetic poles, wherein each pole comprises: an arched inner portion, forming an inner ring with other arched inner portions, wherein a rotator rotates within the inner ring; and a radial portion, wherein a coil is wound on the radial portion; and an arched outer portion, preventing the coil from being separated from the poles.

The present invention also provides a driver circuit for driving the motor, The driver circuit comprises an AC-to-DC converter converting AC power supply into DC power supply; a voltage detector detecting a voltage of the DC power supply; a current detector detecting a current of the DC power supply; and a controller generating a driving signal for driving the motor according to the detected voltage and current.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The best embodiments of the present invention will be described in detailed below. These embodiments are explained to illustrate the principles of the present invention but not to limit the scope of the present invention. The scope of the present invention will be defined in the appended claims.

Waterproof and Dustproof Motor Structure

Figure 1:
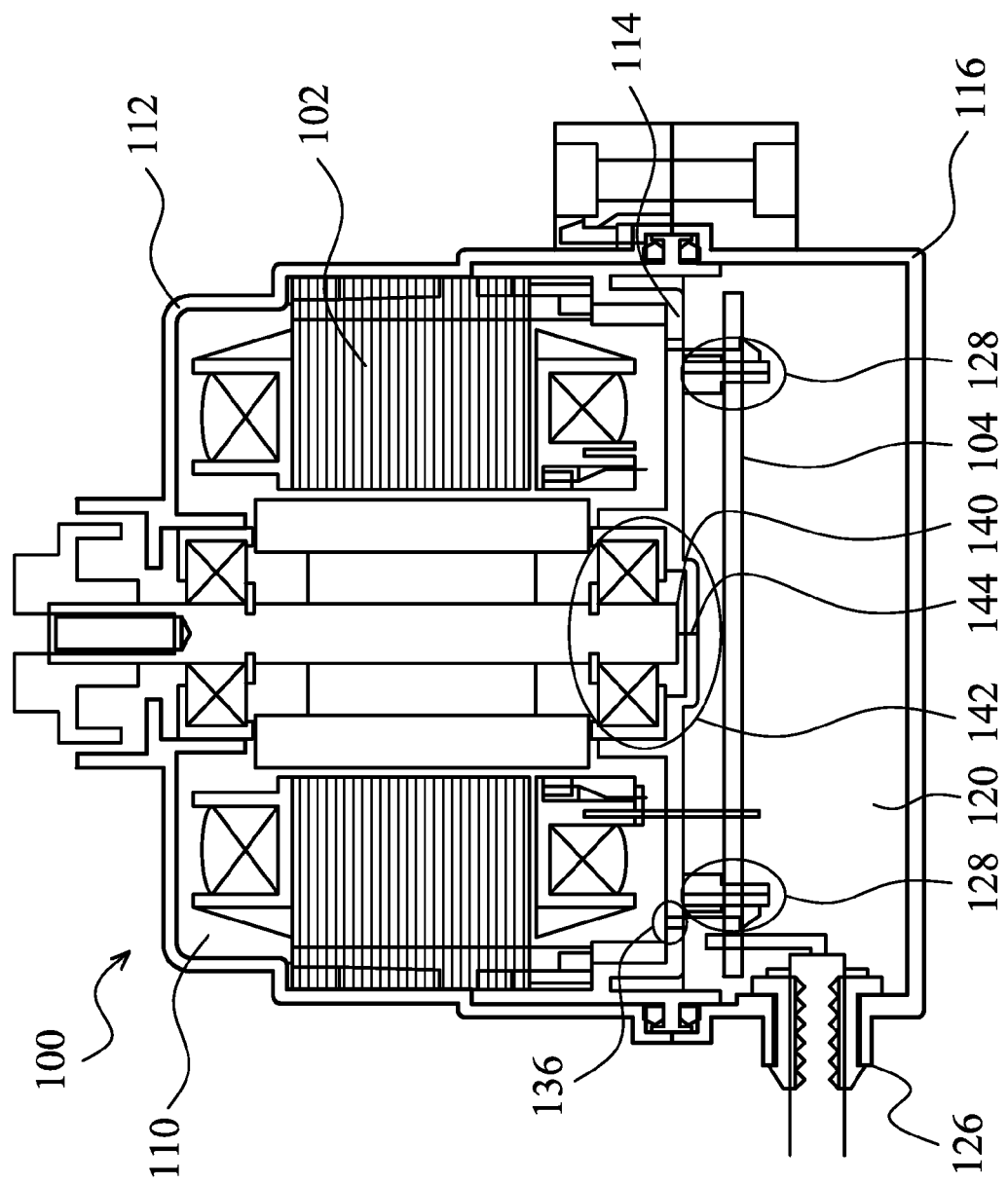
FIG. 1 is a schematic diagram of a motor structure according to an embodiment of the present invention.

In the prior art, the motor and its related circuit are easy to get humidity because of defects in structural design. Therefore, the present invention provides a special motor structure which is waterproof and dustproof. Those skilled in the art can understand that, when a device is waterproof, it should be dustproof. Thus, the dustproof function of the present invention will not be particularly illustrated below. FIG. 1 is a schematic diagram of a waterproof and dustproof motor structure according to an embodiment of the present invention. The waterproof and dustproof motor structure 100 of the present invention comprises: a motor 102, a circuit board 104, an upper shell 112, a base 114 and a lower shell 116. These elements will be further described in the following in accordance with FIGS. 1-3.

Similarly to the prior art, the motor 102 of the present invention has a stator, a rotator and a bearing; however, the present invention additionally has a circuit board 104 for controlling the motor 102. Specifically, the circuit board 104 is electrically connected to the motor 102 and a system (not shown) outside of the motor structure, and is used to control the motor 102 by exciting magnetic field on stator of the motor 102 according to sensing signals from the sensors, such as Hall sensor on the motor 102, and control signal from the circuit board 104.

The main feature of the present invention is a special tight structure which is made up of the upper shell 112, the base 114 and the lower shell 116. A tight chamber (first tight chamber) 110 is formed by closing the upper shell 112 and the base 114 together, while another tight chamber (second tight chamber) 120 is formed by closing the base 114 and the lower shell 116. In some embodiments, for tight connecting the upper shell 112 and the base 114, o-rings can be set between the upper shell 112 and the base 114, the base 114 to the lower shell 116, and the upper shell 112 to the lower shell 116. However, those skilled in the art can tightly close the shells (i.e., the upper shell 112 and the lower shell 116) and base through a variety of existing technologies, and the present invention should not be limited thereto.

As shown in FIG. 1, the motor 102 is disposed in the first tight chamber 110, and the circuit board 104 is disposed in the second tight chamber 120. Thus, the motor 102 and the circuit board 104 of the present invention are respectively disposed in different tight chamber. Note that, in the prior art, the motor and the circuit board are configured in the same place and not separated from each other, so that humidity can easily enter the shells of the motor via the opening of the motor shaft and damage the circuit board of the motor. The present invention arranges the circuit board 104, which is the most fragile component in the motor system against humidity, in an isolated and tight chamber, thus lowering the risk of failure, and easing the maintenance.

In addition to the two independent tight chambers, the wire outlet 126 of the present invention is different from that in the prior art. In the prior art, the wire outlet of the circuit board is usually disposed between two shells so it is easy for the circuit board to get damp. To prevent this defect, the present invention changes the arrangement of the motor structure, and disposes the wire outlet 126 of the circuit board 104 on the lower shell 116 independently. In some embodiments, rubber material can be used to seal the wire outlet 126.

In some embodiments, the circuit board 104 of the present invention is fixed to the bottom side of the base 114 through connecting to a supporting structure 128 of the base 114. In some embodiments, the base 114 includes a through hole 136, which is used for the wires of the circuit board to be connected to the motor 102 (connected to coils and Hall sensors of the motor 102, for example). In some embodiments, the through hole 136 is water tight with rubber materials.

In some embodiments, a bearing base 142 is disposed on the upper side of the base 114, and an axle 140 of the bearing can be configured on it. In some embodiments, the bearing base 142 of the present invention has a sealed blind hole 144, and the axle of the bearing can be inserted to the blind hole 144. It can be found that the base 114 of the present invention not only separates the two independent tight chambers, but also stabilize the motor 102.

Silicon Steel Stator Structure of the Motor

Figure 2:
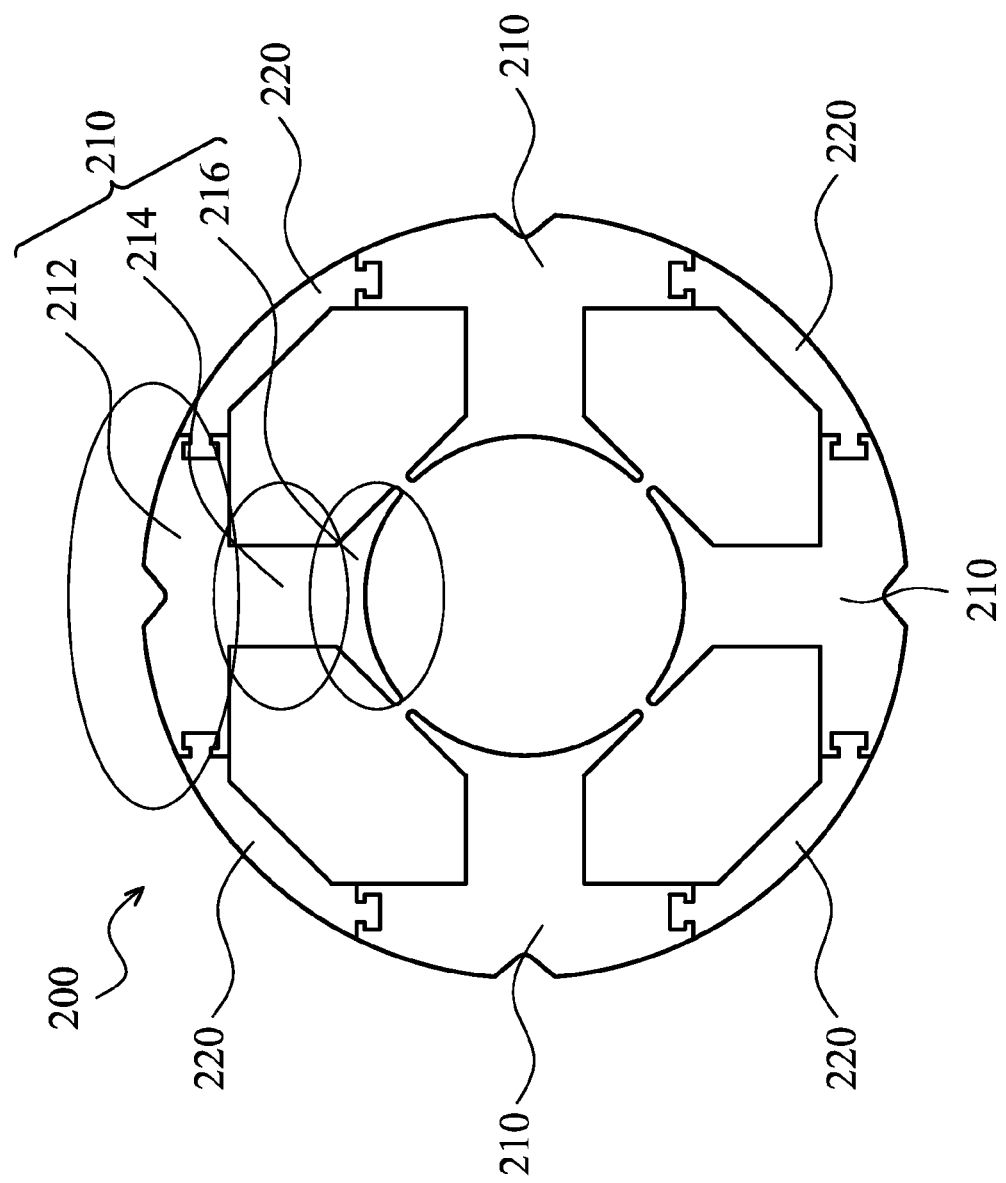
FIG. 2 is the top-view of a silicon steel stator structure according to an embodiment of the present invention.

The present invention further provides improvements for a silicon steel stator structure. FIG. 2 is the top-view of a silicon steel stator structure according to an embodiment of the present invention. The silicon steel stator structure 200 of the present invention comprises a plurality of poles 210 and a plurality of connectors 220. The poles 210 respectively correspond to the magnetic poles. Since there are four magnetic poles in the embodiment of FIG. 2, the entire silicon steel stator structure has four poles in total, which respectively correspond to four connectors. Those skilled in the art can understand that the number of the poles and the connectors of the present invention should not be limited to this embodiment.

As shown in FIG. 2, each pole 210 of the silicon steel stator structure 200 in the present invention are independent from each other, and has: an arched inner portion 216, a radial portion 214, and an arched outer portion 212. These three portions form the entire pole 210, thus in some embodiments, each pole 210 can be formed in one piece.

In the present invention, each arched outer portion 212 of the pole 210 is in an arched shape, and independent (separated) from the other outer portions 212, as shown in FIG. 2. The four arched inner portions 216 of the present invention are arranged in an inner ring. The inner ring forms a cylindrical space so that the rotator can rotate in the space.

In the present invention, the radial portion 214 of the pole 210 radially extends from the inner portion 216 to the outer portion 212. In can be found in FIG. 2 that the width of the radial portion 214 of the present invention is less than the arc length of the arched inner portion 216, and also less than the arc length of the arched outer portion 212. Coils (not shown) of the motor can be wound on the radial portion 214.

In the present invention, the arched outer portion 212 of the pole 210 is similarly in an arc shape. Since the arc length of the outer portion 212 is greater than the width of the radial portion 214, so as to prevent the coils from being separated from the pole 210. In the silicon steel stator structure 200, each connector 220 can be connected between two arched outer portions 212, so that the four connectors 220 and the four outer portions 212 forms an outer ring. In some embodiments, the arched outer portion 212 and the connector 220 can be mortised to each other as shown in FIG. 2. The connection manner of these components should not be limited to this embodiment.

There are many differences in the silicon steel stator of the present invention and that of the prior art, which are listed below:
(1) the inner ring of the silicon steel stator in the prior art is a complete ring, which connects all of the poles and forms a one-piece structure, but that of present invention are made up of several separated inner portions (216);
(2) the outer ring of the silicon steel stator in the prior art is also a complete ring, but that of the present invention are made up of two types of members—the outer portions (212) of the poles (210) and the connectors (220); and
(3) The portion where coils are wound in the prior art (similar to the radial portion 214 of the present invention) is connected to the inner ring and separated from the outer ring, but the radial portion 214 of the present invention is connected to both the inner ring and the outer ring.

From the above, it can be found that the magnetic poles in the prior art share the same inner ring so that the magnetic fields of the magnetic poles usually interfere with each other and thus produce unfavorable factors to the magnetic field generation efficiency. Contrarily, this problem can be easily prevented through using the independent poles of the present invention. Moreover, the outer ring in the prior art has larger size, which lowers the usage rate of raw materials. Contrarily, the present invention separates the silicon steel stator into several poles and several connectors, and with the smaller size, the present invention is helpful in improving the usage rate of the raw materials. In addition, the arched outer portion 212 of the present invention helps to hold the coils in a fixed position without using retaining walls, thus increasing winding space and the magnetic field generation efficiency.

In some embodiments, one can cover the poles 210 of the present invention with insulation plastic, e.g., through injection molding skill, then wind the coils on the radial portions 214, and finally assemble the connectors 220 and the poles 210. From the Figs., those skilled in the art can understand that the silicon steel stator structure of the present invention is made up of several independent parts, which is helpful in assembly of the motor and the coils.

Motor Driver Circuit

Figure 3:
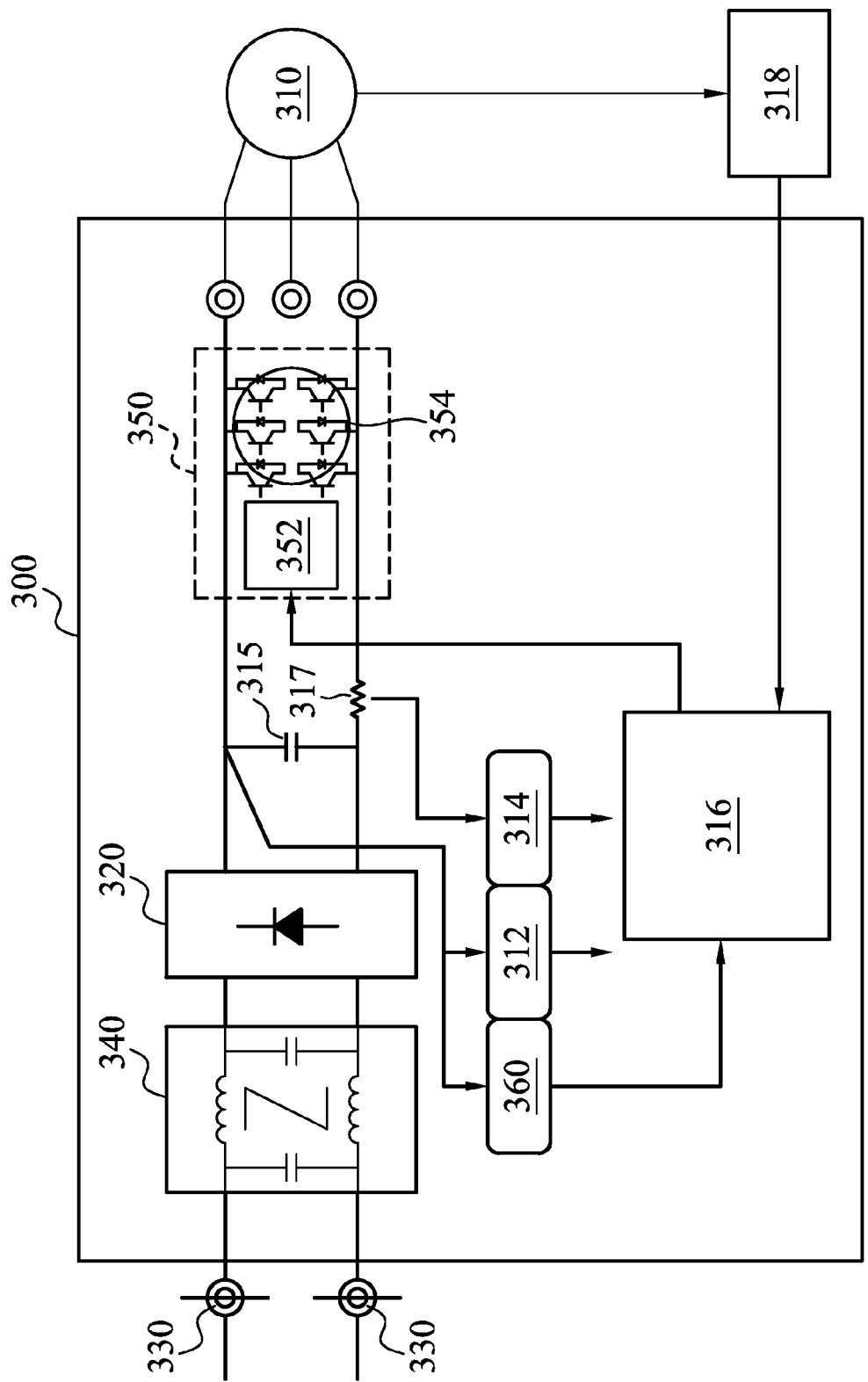
FIG. 3 is a schematic diagram of the driver circuit according to an embodiment of the present invention.

The present invention further designs the driver circuit of the motor. FIG. 3 is a schematic diagram of the driver circuit according to an embodiment of the present invention. The driver circuit 300 of the present invention can be disposed in the circuit board 104 to drive motor (i.e., the motor 102). The driver circuit 300 of the present invention comprises: an AC-to-DC converter 320, a voltage detector 312, a current detector 314, a controller 316, a filter 340, a DC-to-AC converter 350, and a power supply controller 360.

The AC-to-DC converter 320 of the present invention is used to convert the AC power supply 330 into DC power supply. Note that, different from the prior art, the AC-to-DC converter 320 of the present invention is a full-bridge architecture, which increases the control range for the rotation speed. For example, the rotation efficiency in the present invention is about two times of that in the prior art.

The voltage detector 312 and the current detector 314 of the present invention are respectively used to detect the voltage and current values of the DC power supply, and the controller 316 of the present invention can generate the driving signal for driving the motor 310 according to the voltage and current values. The controller 316 of the present invention is use the quasi-sine wave current control technology to generate the driving signal (refer to patent document TW 101126532). With the driving signal produced through this technology, the motor can causes less vibration and noise.

Note that the voltage detector 312 and current detector 314 can halt the power supply once detecting any abnormal voltage and/or current on the motor coils, thus preventing the motor from being damaged due to overvoltage or overcurrent.

In some embodiments, in addition to the voltage and current values, the controller 316 of the present invention generates the driving signal further according to a magnetic field signal from the Hall sensors 318 of the motor 310.

In some embodiments, the driving signal generated by the controller 316 of the present invention is provided to the driver controller 352 of the DC-to-AC converter. The driver controller 352 generates the power supply for motor 310 according to the driving signal. In some embodiments, the power supply of the motor 310 is a single-phase power, and the driver controller 352 can control the phases of the voltage through a plurality of (e.g., 4-6) digital switches 354.

In some embodiments, the power supply controller 360 of the present invention further generates a power (e.g., +15V, +5V or −4V) for the controller 316 according to demand of the controller 316.

In some embodiments, the filter 340 of the present invention can be used to filter the electromagnetic interference (EMI) to increase the operational efficiency of the motor.

In some embodiments, the driver circuit 300 of the present invention has a bulk capacitor 315, which can rectify the power supply and smooth the voltage of the DC power supply. In some embodiments, the driver circuit 300 of the present invention has a shunt resistor 317, which can help the current detector 314 to capture the current value of the driver circuit.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A motor structure, comprising:
    a motor;
    a circuit board, comprising a driver circuit for controlling the motor;
    an upper shell;
    a base;
    a lower shell;
    an outlet, disposed on a side of the lower shell independently, wherein wires of the circuit board is connected to the exterior of the motor structure through the outlet;
    a rubber material, used to seal the outlet;
    a first tight chamber, formed by closing the upper shell and the base together, wherein the motor is disposed in the first tight chamber; and
    a second tight chamber, formed by closing the base and the lower shell together, wherein
    the circuit board is disposed in the second tight chamber, wherein the motor comprises a silicon steel stator structure comprising:
    a plurality of poles, covered with insulated plastic and corresponding to a plurality of magnetic poles, wherein each pole comprises: an arched inner portion, forming an inner ring with other arched inner portions, wherein a rotator rotates within the inner ring; a radial portion, wherein a coil is wound on the radial portion; and an arched outer portion, preventing the coil from being separated from the poles; and
    a plurality of connectors, wherein each connector is connected between two poles, and forms an outer ring with the arched outer portions, and the connectors and the poles are detachable;
    the driver circuit further comprises:
    a voltage detector, detecting a voltage of a direct current (DC) power supply;
    a current detector, detecting a current of the DC power supply; and
    a controller, generating a driving signal for driving the motor according to the detected voltage and current;
    a power supply controller, generating a power to the controller;
    wherein the controller uses quasi-sine wave current control technology to generate the driving signal;
    wherein the controller generates the driving signal further according to a magnetic field signal provided by a Hall sensor on the motor.

2. The motor structure as claimed in claim 1, wherein the circuit board is fixed to the bottom side of the base through connecting to a supporting structure of the base.

3. The motor structure as claimed in claim 1, wherein the upper shell or the lower shell is closely connected to the base with O-rings.

4. The motor structure as claimed in claim 1, wherein the upper side of the base comprises a bearing base for fixing a bearing of the motor.

5. The motor structure as claimed in claim 4, wherein the bearing base comprising a blind hole for an axle of the bearing to insert thereto.

6. The motor structure as claimed in claim 1, wherein the base comprises a through hole and wires of the circuit board is connected to the motor by the through hole.

7. The motor structure as claimed in claim 1, wherein the driver circuit further comprises:
    a filter, filtering the electromagnetic interference (EMI).

8. The motor structure as claimed in claim 7, wherein the driver circuit further comprises:
    a DC-to-AC converter, comprising:
        a driver controller, generating a single-phase power of the motor according to the driving signal.

* * * * *